July 15, 1952 — R. J. OLANDER — 2,603,479
FRICTION SHOCK ABSORBER FOR RAILWAY CAR TRUCKS
Filed April 21, 1950 — 2 SHEETS—SHEET 1

Inventor:
Roland J. Olander.
By Henry Fuchs
Atty.

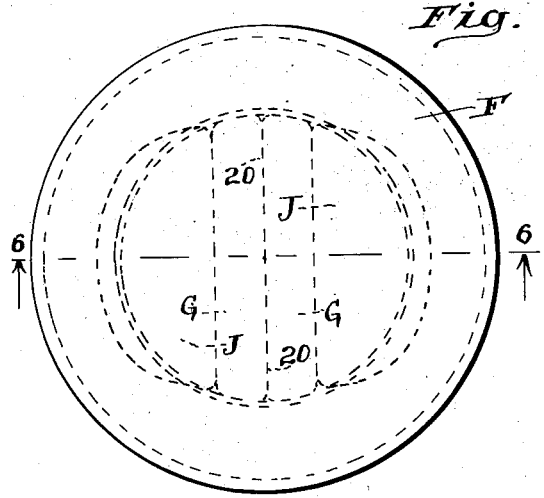
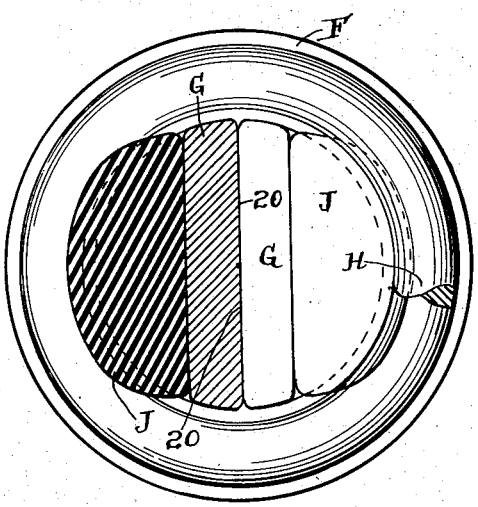
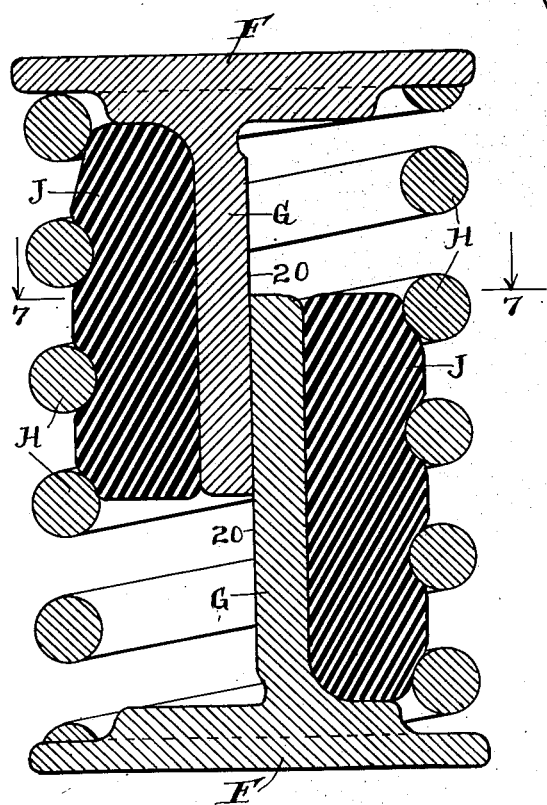

Patented July 15, 1952

2,603,479

UNITED STATES PATENT OFFICE 2,603,479

FRICTION SHOCK ABSORBER FOR RAILWAY CAR TRUCKS

Roland J. Olander, Chicago, Ill., assignor to W. H. Miner, Inc., Chicago, Ill., a corporation of Delaware Application April 21, 1950, Serial No. 157,329

5 Claims. (Cl. 267—9)

1

This invention relates to improvements in friction shock absorbers, especially adapted for use in connection with truck springs of railway cars for snubbing the action of the springs.

One object of the invention is to provide a friction shock absorber of the character indicated, comprising relatively lengthwise movable friction posts in sliding frictional contact with each other, and a coil spring surrounding the posts and yieldingly opposing lengthwise movement of the same toward each other, wherein the posts are pressed into tight frictional engagement with each other by rubber pads under initial compression, interposed between the outer sides of the posts and the inner side of the coil spring.

Other objects of the invention will more clearly appear from the description and claims hereinafter following.

Figure 1:
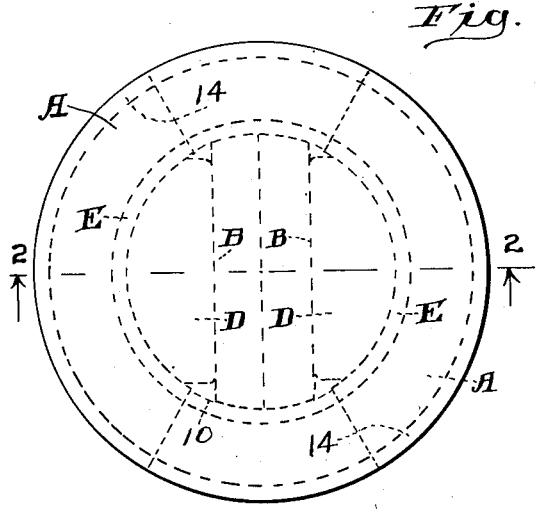
Figure 3:
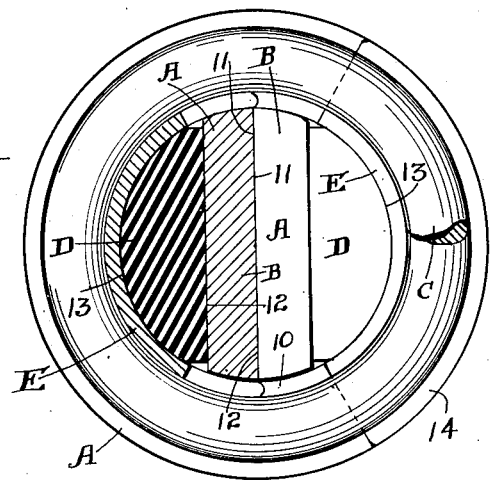
Figure 2:
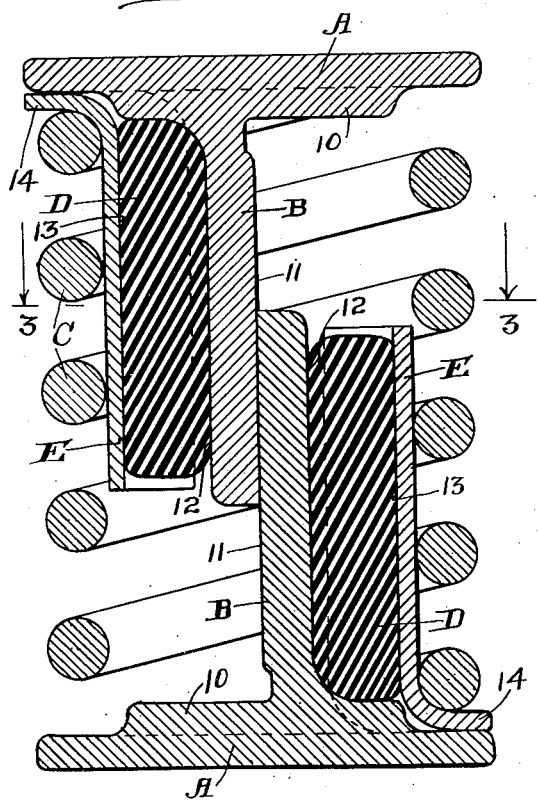
Figure 4:
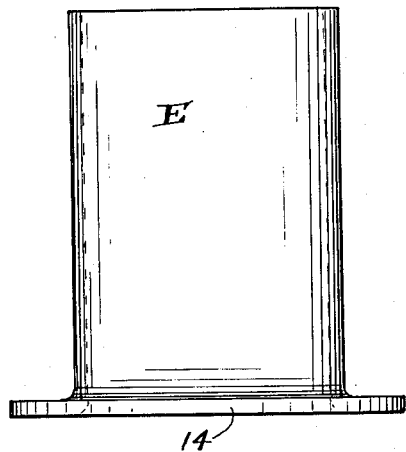

In the accompanying drawings forming a part of this specification, Figure 1 is a top plan view of my improved friction shock absorber. Figure 2 is a transverse, vertical sectional view, corresponding substantially to the line 2—2 of Figure 1. Figure 3 is a horizontal sectional view, corresponding substantially to the line 3—3 of Figure 2. Figure 4 is an outside elevational view of the liner at the right hand side of Figure 2, looking from right to left in said figure. Figure 5 is a view similar to Figure 1, illustrating another embodiment of the invention. Figure 6 is a transverse, vertical sectional view, corresponding substantially to the line 6—6 of Figure 5. Figure 7 is a horizontal sectional view, corresponding substantially to the line 7—7 of Figure 6.

Referring first to the embodiment of the invention illustrated in Figures 1 to 4 inclusive, my improved shock absorber comprises broadly top and bottom followers A—A, top and bottom friction posts B—B, a spring C, top and bottom rubber pads D—D, and top and bottom metal liner plates E—E.

The top and bottom followers A—A are of the same design, each being in the form of a heavy metal disc. The top and bottom posts B—B are formed integral with the followers A—A, the top post B depending from the top follower A and the bottom post B upstanding from the bottom follower A. At the inner end of each post B, the corresponding follower A is provided with a central, cylindrical boss 10 which forms the base of the post, and serves as a centering means for the spring C. Each post B is in the form of a relatively thick, flat plate, having a lengthwise extending, flat friction surface 11 on its inner side

2 in sliding engagement with the friction surface 11 of the other post.

The spring C is in the form of a helical coil, surrounding the posts B—B. The top and bottom ends of the spring C bear on the top and bottom followers A—A, respectively. The spring C yieldingly opposes relative movement of the followers toward each other.

The rubber pads D—D are interposed between the inner sides of the spring C and the outer sides of the posts B—B, each pad being in the form of a block having a flat inner side 12 which bears on the outer side of the corresponding post B. The outer side of each block is transversely curved, as indicated at 13, to bear truly on the inner side of the corresponding liner plate E, which is interposed between the inner side of the spring and said pad D. The pad D is preferably bonded to the liner plate E by being vulcanized to the same. The body portion of each liner plate E is transversely curved to fit the curved interior side of the spring C and the curved exterior side of the corresponding pad D. Each liner plate E has a horiozntal, laterally outwardly projecting flange 14 at its outer end, the flange 14 of the top plate being at the upper end thereof and interposed between the upper end of the spring C and the underneath side of the top follower A, and the flange 14 of the bottom plate being at the lower end thereof and interposed between the lower end of the spring C and the top side of the bottom follower A. The rubber pads D—D are under initial lateral compression and press the posts B—B against each other, being buttressed against the inner side of the spring C, through the medium of the interposed liner plates E—E.

My improved shock absorber preferably replaces one or more of the spring units of a truck spring cluster, being interposed between the top and bottom spring follower plates of the cluster of truck springs.

The operation of my improved shock absorber, as illustrated in Figures 1 to 4 inclusive, is as follows: Upon the spring cluster of the truck of a railway car being compressed between the follower plates of said cluster, the improved shock absorber is compressed therewith, forcing the top follower A and the top post B downwardly with respect to the bottom post B, against the resistance of the spring C, thereby sliding the top post B downwardly on the bottom post B. In addition to the friction thus provided between the posts, frictional resistance is also provided by lengthwise sliding movement of the coils of the spring C on the liner plates E—E. High frictional resistance is thus provided to snub the action of the truck springs.

As the spring follower plates of the truck springs are separated, due to recoil of said springs, the followers A—A are moved apart by the expansive action of the spring C, thereby restoring the parts of the mechanism to the normal full release position shown in Figure 2.

Referring next to the embodiment of the invention illustrated in Figures 5, 6, and 7, my improved shock absorber differs from that shown in Figures 1, 2, 3, and 4 in that the liners between the rubber pads and the coil spring are omitted. The shock absorber shown in Figures 5, 6, and 7 comprises broadly top and bottom followers F—F, top and bottom friction posts G—G, a spring H, and rubber pads J—J.

The followers F—F and the posts G—G are identical with the followers A—A and the posts B—B hereinbefore described, the posts G—G having longitudinally extending friction surfaces 20—20 on their inner sides which are in sliding engagement with each other.

The spring H is in the form of a helical coil surrounding the posts G—G and bearing at its top and bottom ends on the top and bottom followers F—F, respectively.

The pads J—J are similar to the pads D—D hereinbefore described, being in the form of rubber blocks which are under initial lateral compression between the spring H and the outer sides of the posts G—G. The pads J—J bear directly on the inner sides of the spring H, as clearly shown in Figure 6, and are preferably vulcanized to the outer sides of the posts G—G.

In the operation of the improved shock absorber shown in Figures 5, 6, and 7, during both compression and expansion of the mechanism, friction is provided between the posts G—G which are held in tight frictional engagement with each other by the rubber pads J—J.

I claim:

1. In a friction shock absorber, the combination with top and bottom friction posts relatively movable lengthwise of the mechanism with respect to each other, said posts being in sliding engagement with each other; of a spring surrounding said posts and yieldingly opposing relative lengthwise movement of the same; and rubber blocks confined between said posts and inner sides of said spring, said spring holding said blocks laterally compressed against said posts.

2. In a friction shock absorber, the combination with top and bottom friction posts relatively movable lengthwise of the mechanism with respect to each other, said posts being in sliding engagement with each other; of top and bottom followers at the top and bottom ends of said posts, respectively, said followers being integral with said posts; a coil spring surrounding said posts and bearing at its top and bottom ends on said top and bottom followers; and rubber blocks confined between said posts and the inner sides of said spring, said spring holding said blocks laterally compressed against said posts.

3. In a friction shock absorber, the combination with top and bottom friction posts relatively movable lengthwise of the mechanism with respect to each other, said posts being in sliding engagement with each other; of a spring surrounding said posts and yieldingly opposing relative lengthwise movement of the same; rubber blocks under lateral compression confined laterally between said posts and inner sides of said spring; and metal liner plates interposed between and bearing on said blocks and the inner side of said spring.

4. In a friction shock absorber, the combination with top and bottom friction posts relatively movable lengthwise of the mechanism with respect to each other, said posts being in sliding engagement with each other; of top and bottom followers at the top and bottom ends of said posts, respectively, said followers being integral with said posts; a coil spring surrounding said posts and bearing at its top and bottom ends on said top and bottom followers; rubber blocks under lateral compression confined laterally between said posts and the inner sides of said spring; and metal liner plates interposed between and bearing on said blocks and the interior portion of said spring.

5. In a friction shock absorber, the combination with top and bottom friction posts relatively movable lengthwise of the mechanism with respect to each other; of top and bottom followers at the top and bottom ends of said posts, respectively, said followers being integral with said posts; a coil spring surrounding said posts and bearing at its top and bottom ends on said top and bottom followers; rubber blocks under lateral compression confined laterally between said posts and the inner sides of said spring; and top and bottom liner plates interposed between said blocks and spring, said top plate having a flange at its upper end bearing on said top follower and on which the upper end of the spring is seated, said bottom plate having a flange at its bottom end bearing on said bottom follower and on which the lower end of said spring is seated.

ROLAND J. OLANDER.

REFERENCES CITED

The following references are of record in the file of this patent:

UNITED STATES PATENTS

| Number | Name | Date |
|---|---|---|
| 1,169,863 | Peycke | Feb. 1, 1916 |
| 1,924,814 | Sproul | Aug. 29, 1933 |
| 2,289,790 | Light | July 14, 1942 |
| 2,410,160 | Haseltine | Oct. 29, 1946 |